United States Patent Office 3,461,177
Patented Aug. 12, 1969

3,461,177
PROCESS TO CONVERT NORMAL-HEXANE
TO NAPHTHENES
E. O. Box, Jr., and Harold J. Hepp, Bartlesville, Okla.,
assignors to Phillips Petroleum Company, a corporation of Delaware
No Drawing. Continuation-in-part of application Ser. No.
681,562, Nov. 8, 1967, which is a continuation-in-part
of application Ser. No. 615,078, Feb. 10, 1967. This
application Dec. 26, 1967, Ser. No. 693,192
Int. Cl. C07c 5/18, 5/30
U.S. Cl. 260—673.5      2 Claims

ABSTRACT OF THE DISCLOSURE

Alkanes, cycloalkanes, arylalkanes, and certain substituted alkanes, and particularly n-butane and n-hexane, diluted with steam, are dehydrogenated (in a single stage or in two stages) in the absence of free $O_2$ at high conversion and selectivity to less saturated compounds with a catalyst composite including one or more metals of the platinum group and nickel deposited on a support such as alumina, silica, or a Group II aluminate spinel which is alkalized with an alkali or alkaline earth metal compound such as $K_2CO_3$ or BaO to impart a pH of at least 8 to the composite. Normal-hexane over 0.5% Pt on zinc aluminate for 24.6% conversion per pass at 70 p.s.i.g., 1010° F., and 12.9 steam-to-hexane mol ratio yielded 24% lighter than $C_5$ (including $CO_2$ and $H_2$), 31% $C_6$ olefins, 30.5% benzene, and 14.7% naphthenes.

This application is a continuation-in-part of application, Ser. No. 681,562, filed Nov. 8, 1967, which is a continuation-in-part of application, Ser. No. 615,078, filed Feb. 10, 1067, now abandoned.

The invention relates to an improved process for the dehydrogenation of dehydrogenatable hydrocarbons and certain substituted hydrocarbons.

It is conventional in the dehydrogenation of paraffin hydrocarbons to utilize catalysts such as nickel-kieselguhr, chromium oxide-alumina, zinc oxide-alumina, platinum-alumina, and the like. In general, prior art processes are operated with a water-free feed stock and at a low pressure. Considerable advantages are inherent in any process that can operate with steam. For instance, heat of reaction can readily be supplied. Coke deposition on the catalyst can be retarded. Expensive compression of products can be avoided since elevated pressures can be employed and steam can readily be condensed after dehydrogenation is effected. For reasons such as these, various attempts have been made to employ steam in processes for the dehydrogenation of paraffin hydrocarbons. One of the most successful catalysts to effect this result is broadly disclosed in U.S. 3,168,587 wherein a platinum catalyst on a support such as zinc aluminate is disclosed to be one possible catalyst for the dehydrogenation of paraffin hydrocarbons in the presence of steam and oxygen.

We have now found that highly active catalysts for the dehydrogenation of steam-diluted alkanes, cycloalkanes, arylalkanes, and substituted alkanes in which a stable nitrogen-containing heterocyclic radical has been substituted for a hydrogen, can be prepared by treating certain Group VIII metal catalysts that are supported on spilen compounds, such as zinc aluminate spinel, with sufficient Group Ia and/or Group IIa compounds (such as the carbonates, acetates, hydroxides, and the like of sodium, calcium, magnesium, beryllium, barium, and the like) to neutralize the acid sites of the supported catalyst (effecting a pH of at least 8) and thus promote the activity of the supported platinum and/or other Group VIII metal catalyst for effecting the dehydrogenation of alkanes, etc., in the presence of substantial volumes of steam. Other porous carriers enumerated below may be substituted for the spinel compound but their use results in the formation of somewhat less active catalysts.

The groups of metals referred to herein are as classified in the Periodic Table published in the Chemical Rubber Company's Handbook of Chemistry and Physics, 45th edition (1964), p. B–2.

The catalysts of our invention can be prepared by combining, in any manner known to the art, certain Group VIII metals or metal compounds capable of reduction, including nickel, platinum, ruthenium, palladium, ridium, rhodium, osmium, and mixtures thereof, with a base or support selected from the members alumina, HF-treated alumina, silica, magnesia, zirconia, alumino-silicates, Group II aluminate spinels, and mixtures thereof, including mixtures of spinel and excess Group II metal oxide or spinel and excess alumina, and further treating the resulting composite by any means known to the art with at least one alkali or alkaline earth metal compound, such as sodium hydroxide, potassium carbonate, lithium hydroxide, barium acetate, barium hydroxide, calcium oxide, and the like, so as to impart to the resulting composite an alkaline pH of at least 8. The Group VIII metal content of the catalyst should be in the range of 0.1 to 5 weight percent of the support or base. Throughout this application the term "weight percent of the support or base" means parts by weight per 100 parts by weight of support or base. Sufficient alkali or alkaline earth metal compound or compounds are used to neutralize the acid sites of the catalyst composite including the metal and support, to leave the composite alkaline, and to activate the catalyst for the dehydrogenation of steam-diluted alkanes. The optimum amount of each alkali or alkaline earth metal compound or combination of compounds for each supported metal catalyst must be determined experimentally, but usually an amount in the range of 0.5 to 10 weight percent of the total catalyst is effective. However, sufficient alkaline material must be employed to impart an alkaline pH of at least 8 to the catalyst.

We have also found that preparing the catalyst of the invention with platinum group metal compounds containing no nonvolatile acidic radicals imparts long on-steam life to the catalyst. Preferred compounds of this type are the complex or coordination compounds of the platinum metals.

Any platinum-group metal compound containing no nonvolatile acidic radical can be used. In the discussion of the compounds that can be used the platinum compounds will be used as nonlimiting examples. It is to be understood that similar compounds of the other platinum-group metals can be used. Examples of simple or non-coordination compounds that can be used are platinic chloride, chloroplatinic acid, ammonium chloroplatinate, and the like. Many complex or coordination divalent and tetravalent platinum compounds are known in which there are four and six groups, respectively, inside the complex, and either none, one, or two, or none, one, two or four radicals, respectively, outside the complex. The groups inside the complex can be neutral, e.g., hydrocarbyl, amine, hydroxylamine, ethylenediamine, hydrazine, CO and the like; basic, e.g., hydroxy, and the like; or volatile acidic, e.g., nitrile, nitrate, CN, carbonate, and the like. When added to the support from solution, some of the compounds can be added from aqueous solution, but others will require nonaqueous solvents such as alcohols, hydrocarbons, ethers, ketones, and the like. Non-limiting examples of coordination platinum compounds that can be used are: platinum amminoacetate, platinum dimethyl dioxime, platinum diammine dinitrate, platinum tetraammine dihydroxide, platinum diammine dihydroxide, platinum hexammine dihydroxide, platinum hexammine tetrahydroxide, platinum diammine tetrahydroxide, platinum dihydroxide dinitrate, platinum diammine tetranitrate, platinum diammine dinitrite, platinum tetraamine dicarbonate, platinum diammine oxalate, and the like.

The catalyst systems of this invention are employed at temperatures between 750 and 1250° F., preferably between 1000 to 1100° F., and at pressures in the range of 0 to 500 p.s.i.g., preferably 0 to 250 p.s.i.g., Steam to hydrocarbon mol ratios of 0.5:1 to 30:1, preferably 2.5:1 to 5:1, are employed. Total space velocity (GHSV) of hydrocarbon and steam is between 100 and 50,000, preferably between 500 and 20,000 volumes of gas/volume of catalyst/hour (32° F. 15 p.s.i.g. absolute pressure).

The modified catalysts of the invention are particularly well adapted to the dehydrogenation of alkanes, cycloalkanes, and arylalkanes containing from 2 to 12 carbon atoms. These hydrocarbons include ethane, propane, butanes, hexanes, octanes, dodecanes, cyclohexane, cyclododecane, cyclopentane, ethyl benzene, n-butylbenzene, and the like. In addition, compounds that optionally contain a stable heterocyclic moiety such as pyridyl, piperidyl, and the like, substituted for a hydrogen of such hydrocarbons are effectively dehydrogenated with the modified catalyst in the presence of steam and in the absence of oxygen. Examples of such substituted compounds include 3-ethylpyridine, 4-propylpyridine, 3-n-butylpiperidine, and the like. Catalysts prepared by depositing the selected dehydrogenating metal on spinels and alkalizing the composite are preferred to those utilizing other supports or bases because of their higher conversion activity and selectivity for olefins. Spinels, as referred to herein, are compounds of the formula $M(AlO_2)_2$ or $MO \cdot Al_2O_3$ wherein M is a Group IIa or IIb metal ion with a valence of 2.

In one embodiment of the invention, $C_3$ to $C_{12}$ paraffin hydrocarbons such as n-butane, n-pentane, isopentane, hexanes, and the like, are dehydrogenated to the corresponding diolefins, i.e., 1,3-butadiene, 1,3-pentadiene, isoprene, and the like, the dehydrogenation being effected in first and second dehydrogenation zones in series. In this operation, steam and the steam-active catalysts of the invention are used in the first zone. The effluent from the first zone, including steam, hydrogen, olefin, diolefin, and unreacted paraffin, is passed to the second zone where it is contacted with a steam-active olefin dehydrogenation catalyst.

In accordance with another embodiment of the invention, hexanes, particularly n-hexane, in admixture with steam, are hehydrocyclized in contact with our steam active catalyst to cyclic hydrocarbons including methylcyclopentene, methylcyclopentane, methylcyclopentadiene, cyclopentane, and benzene. Preferred operating conditions for this reaction comprise a steam-to-hydrocarbon ratio in the range of 1:1 to 15:1, a temperature in the range of 850 to 1050° F., a pressure in the range of 15 to 500 p.s.i.g., and a liquid hourly space velocity of hydrocarbon in the range of 1 to 10 volumes per volume of catalyst.

Olefins, diolefins, unreacted paraffin, water (steam), and hydrogen are separately recovered from the effluent from the second zone. Recovered olefin is recycled to the second zone and recovered paraffin is recycled to the first zone. Steam is generally added to the effluent from the first zone (feed to second zone) for temperature control.

Operating conditions for the first dehydrogenation zone are those disclosed herein for dehydrogenating with our improved catalyst. The dehydrogenating conditions used in the second zone to effect olefin dehydrogenation are those found in U.S. Patent to E. W. Pitzer 2,866,790 and include a temperature in the range of about 1050–1300° F., steam to olefin mole ratio of about 1:1 to 20:1, olefin space velocity in the range of 100 to 1000 v./v. cat./hr., and a pressure of atmospheric or higher.

The olefin dehydrogenation catalyst is an alkalized iron oxide containing one or more promoters and/or stabilizers such as $Cr_2O_3$. These catalysts are more fully disclosed in U.S. Patents Pitzer 2,866,790; Kearby 2,426,829; Gutzeit 2,408,140; and Eggertsen et al. 2,414,585. A representative catalyst comprises by weight about 45 percent $Fe_2O_3$-52 percent $K_2CO_3$-3 percent $Cr_2O_3$.

EXAMPLE I

A catalyst support wherein the atom ratio of Zn to Al was 1:1 was prepared by coprecipitating a zinc oxide-aluminum oxide gel from a solution of zinc nitrate and aluminum nitrate with ammonium hydroxide, allowing to stand for 1 hour, filtering, washing repeatedly, drying under heat lamps, sieving to 8–20 mesh (U.S. Sieve), and heating to 850° F. in air for several hours. The calcined spinel thus formed had a pH of 6.7 in water (2 g. sample of catalyst in 50 cc. of water); it was actually a mixture of the spinel $ZnO \cdot Al_2O_3$ and ZnO. This calcined spinel support was then charged to a reactor and a stream of n-butane and steam was charged to the reactor as presented below in run 1. Samples were taken one hour after the initial steady state conditions were established. After run 1 was completed, the zinc spinel was heated in the presence of oxygen to remove any carbon and removed from the reactor. In this and other carbon-removal operations described in the examples carbon removal was effected during a 1-hour period using air or nitrogen-diluted air at such dilution and flow that the maximum temperature in the catalyst bed did not exceed 1050° F. It was then soaked in aqueous platinic chloride solution in such manner as to impregnate with 0.56 wt. percent Pt based on the zinc spinel. The Pt-zinc spinel catalyst was charged to the reactor and n-butane and steam were charged for run 2 as presented below. In like manner, after run 2, the catalyst of that run was heated in the presence of oxygen to remove any carbon deposits, removed, soaked in aqueous $K_2CO_3$ solution in such manner as to impregnate with 2.0 wt. percent $K_2CO_3$ based on the zinc spinel, and charged to the reactor. Run 3 was made in like manner as is presented below. Before each run the catalyst was reduced in $H_2$ at 1000° F. Such treatment with hydrogen is not essential, but is desirable for the first run made with a freshly prepared catalyst of this type to stabilize activity more rapidly.

|  | Run 1 | Run 2 | Run 3 |
| --- | --- | --- | --- |
| Catalyst | (1) | (2) | (3) |
| Temp., ° F | 1,105 | 1,045 | 1,032 |
| Pressure, p.s.i.g | 115 | 115 | 115 |
| Moles steam/moles $C_4H_{10}$ | 3.9 | 4.0 | 4.3 |
| Catalyst pH | 6.7 | <7 | 10.4 |
| GHSV, total | 2,400 | 2,400 | 2,400 |
| Conversion, percent | 9.2 | 37.7 | 31.8 |
| Distribution of reaction products, mole percent: |  |  |  |
| Methane plus ethane | 69 | 10.2 | 4.7 |
| Propane plus propene | 22 | 24.1 | 7.4 |
| CO plus $CO_2$ | 9 | 10.5 | 5.2 |
| Butenes | Nil | 55.2 | 80.8 |
| Butadiene | Nil | Nil | 2.0 |

[1] Zinc spinel.
[2] Zinc spinel plus 0.56% Pt.
[3] Catalyst of run 2 plus 2.0% $K_2CO_3$.

This example clearly demonstrates that the combination of components of the catalyst system of this invention are necessary to provide a superior catalyst system.

EXAMPLE II

A zinc oxide-aluminum oxide gel ($ZnO/Al_2O_3$ ratio of 1/1) was prepared by the addition of 216 ml. of 28% ammonium hydroxide in 1000 ml. water to 5000 ml. of aqueous solution containing 119 gm. of zinc nitrate (hydrated) and 300 gm. of aluminum nitrate (hydrated) with vigorous stirring. The gel was allowed to stand 1 hour and was then filtered in Buchner funnels. The filter cake was washed repeatedly to remove the ammonium nitrate and then was dried under heat lamps. After drying and sieving to 8–20-mesh, the zinc aluminate was heated to 1000° F. in air for several hours. The calcined spinel was then soaked in aqueous $PtCl_4$ such that 0.5 wt. percent platinum based on spinel was absorbed. The catalyst was again dried under heat lamp. It was then impregnated with aqueous potassium carbonate of such strength that after final drying the catalyst contained 2.0 wt. percent of potassium carbonate. This catalyst was reduced in $H_2$ flow at 1000° F. for about 1 hour immediately prior to a test of activity.

A mixture of steam and normal butane (3.6/1 butane mole ratio) was fed over the catalyst described above at 75 p.s.i.g. total pressure, 1045° F., and 2120 total gas hourly space velocity. After nine hours without regeneration, the butane conversion was still 30.5% with a selectivity of 78.4 mole percent to butenes and butadiene. A sample of the dry gas effluent at this time had the following composition:

| | Mole percent |
|---|---|
| $H_2$ | 32.5 |
| $CH_4$ | 3.3 |
| CO | 0.1 |
| $CO_2$ | 3.9 |
| Ethane and ethene | 1.2 |
| Propane | 0.8 |
| Propene | 1.3 |
| n-Butane | 42.3 |
| Butenes | 14.0 |
| Butadiene | 0.6 |
| | 100.0 |

Only 5.4% of the reacted butane went to carbon oxides and 16.4% to $C_1$–$C_3$ components.

Following the procedure above, another portion of zinc aluminate spinel was impregnated with 0.6 wt. percent platinum. After drying, it was then impregnated to contain 6.4% calcium acetate (monohydrate). The final step before calcination was to impregnate to add 0.5 wt. percent potassium carbonate. This catalyst was calcined at 1000° F., then reduced in hydrogen at 1000° F. for about 1 hour.

In a test at 980° F., 100 p.s.i.g., 4180 total gas hourly space velocity, and 6.06 moles of steam per mole of normal butane, the conversion of butane was 27.9% after 6.7 hours. At this time 84.7 mol percent of the reacted butane was converted to butenes and butadiene. Only 8.2% of the reacted butane was converted to $C_1$–$C_3$ cracked products and 6.2% to CO and $CO_2$. The effluent dry gas had the following composition:

| | Mol percent |
|---|---|
| $H_2$ | 28.9 |
| $CH_4$ | 2.1 |
| CO | 0.1 |
| $CO_2$ | 4.4 |
| Ethane | 0.4 |
| Propane | 0.4 |
| Propene | 0.6 |
| n-Butane | 47.6 |
| Butenes | 14.9 |
| Butadiene | 0.6 |
| | 100.0 |

This example demonstrates that various alkali or alkaline earth compounds and combinations thereof can be employed as the third component of the catalyst system.

EXAMPLE III

Following the same procedure for preparing a spinel as described in Example II, one was prepared where 50% of the zinc was replaced by barium. The calcined spinel was then a 50-50 coprecipitated mixture of zinc aluminate and barium aluminate. The calcined spinel was impregnated with aqueous Pt-Cl to add 0.5 wt. percent platinum and tested for dehydrogenation activity.

After the test the catalyst was removed from the reactor and impregnated with aqueous calcium acetate to contain 2 wt. percent calcium oxide after calcination. A test was again made under like conditions and the advantage of the addition of the alkaline earth oxide may be observed by a comparison of the data from the two tests:

| | 50-50 $BaAl_2O_4$ and $ZnAl_2O_4$ with 0.5% Pt | Same with 2.0% CaO added |
|---|---|---|
| Temp., °F | 1,020 | 1,016 |
| Pressure, p.s.i.g | 75 | 75 |
| Steam/$C_4$ mole ratio | 3.6 | 3.8 |
| GHSV, total | 2,135 | 2,110 |
| Butane conversion, percent | 35.8 | 36.3 |
| Distribution of reacted butane, mole percent: | | |
| Cracking $C_1$–$C_3$ compounds | 31.9 | 19.7 |
| CO plus $CO_2$ | 9.0 | 7.5 |
| Butenes plus butadiene selectivity | 59.1 | 72.7 |
| Dry effluent analysis, mole percent: | | |
| $H_2$ | 35.1 | 34.6 |
| $CH_4$ | 2.7 | 2.7 |
| CO | 0.4 | 0.2 |
| $CO_2$ | 6.7 | 5.9 |
| Ethane | 0.9 | 1.3 |
| Propane | 5.6 | 2.9 |
| Propene | 1.3 | 0.7 |
| n-Butane | 35.6 | 36.9 |
| Butenes | 11.4 | 14.5 |
| Butadiene | 0.3 | 0.3 |

This example demonstrates the latitude that can be practiced in formulating the catalyst system of this invention in that spinels other than zinc aluminate can be employed.

EXAMPLE IV

A gamma alumina of 360 square meter per gram surface area was impregnated with aqueous $PtCl_4$ to add 0.5 weight percent platinum. In a second impregnation, 2.5 weight percent potassium carbonate was added by adsorption from an aqueous solution of the salt. After calcination at 1000° F. and reduction in hydrogen, a portion of 10–20 mesh catalyst was evaluated for dehydrogenation at 1025–1043° F, 2130 total GHSV, 75 p.s.i.g., and with a 3.81 steam to n-butane mole ratio. Results of the test are presented below:

| | Run 1 | Run 2 | Run 3 | Run 4 |
|---|---|---|---|---|
| Temperature, °F | 1,025 | 1,037 | 1,041 | 1,043 |
| Time, hours | 0.25 | 1.0 | 2.0 | 3.0 |
| Conversion, percent | 38.8 | 25.9 | 20.1 | 15.8 |
| Distribution of products, mole percent: | | | | |
| $C_1$–$C_3$ compounds | 58.7 | 44.4 | 40.3 | 34.5 |
| CO plus $CO_2$ | 23.7 | 27.4 | 28.3 | 29.3 |
| Butenes | 17.6 | 28.2 | 31.4 | 36.2 |
| Butadienes | Nil | Nil | Nil | Nil |

EXAMPLE V

A catalyst consisting of 0.5 wt. percent platinum and 8.8 wt. percent barium oxide on a zinc aluminate spinel support was prepared by the method of Example II. Results obtained in butane dehydrogenation after about 14 hours without regeneration and after regeneration are presented below:

| | Run 1 | Run 2 | Run 3, regenerated [1] | Run 4 |
|---|---|---|---|---|
| Temperature, °F | 1,037 | 1,047 | 1,033 | 1,033 |
| On stream, hours | 13.75 | 14.25 | 17.75 | 18.25 |
| Air (percent $O_2$ of $C_4$) | None | 2.7 | 6.7 | None |
| GHSV, total | 4,750 | 4,750 | 4,750 | 4,750 |
| Steam/$C_4$ mole ratio | 4.2 | 4.2 | 4.2 | 4.2 |
| Pressure, p.s.i.g | 75 | 75 | 75 | 75 |
| Conversion, percent | 29.3 | 29.0 | 37.5 | 37.6 |
| Distribution of products, mole percent: | | | | |
| $C_1$–$C_3$ | 7.8 | 9.6 | 14.1 | 11.2 |
| CO plus $CO_2$ | 3.7 | 4.8 | 7.7 | 5.0 |
| Butenes | 85.3 | 83.0 | 76.0 | 81.5 |
| Butadiene | 3.2 | 2.6 | 3.2 | 2.3 |

[1] Catalyst was heated in the presence of oxygen to remove any carbon deposits at 16.5 hours.

These data clearly show that the addition of air to the feed stream as is called for in U.S. 3,168,587 is deleterious to the process of this invention in that conversion and selectivity to butenes are both adversely affected, and an undesirable degree of water-gas activity and undesirable cracking are promoted. This example also further demonstrates the stability of the catalyst of this invention over long runs without the necessity of regeneration. Also demonstrated is the fact that barium oxide is quite suitable as a component of the catalyst system of this invention.

EXAMPLE VI

Three catalysts were used to further demonstrate the process of the invention:

Catalyst A.—This catalyst was prepared by impregnating a portion of Universal Oil Products Company Penex catalyst with sufficient aqueous potassium carbonate solution to give 2 weight percent $K_2CO_3$, drying, and calcining at 1000° F. in hydrogen before use. The Penex catalyst contains about 0.36 weight percent platinum and 3.4 percent fluorine, the balance being active alumina, and is believed to have been prepared by the process of U.S. 2,689,226. It is in the form of about 1.5-mm. diameter spheres. The pH of the calcined catalyst was 0.5.

Catalyst B.—A 10–20 mesh gamma alumina having a surface area of 360 square meters per gram was impregnated with an aqueous platinic chloride solution to give 0.5 weight percent platinum, dried, impregnated with an aqueous potassium carbonate solution to give 2.5 weight percent $K_2CO_3$, dried, and calcined at 1000° F. in hydrogen before use. The pH of the calcined catalyst was 10.4.

Catalyst C.—A 10–20 mesh silica gel was impregnated with an aqueous palladous chloride solution to give 0.46 weight percent palladium, dried, and calcined at 1000° F. in hydrogen before use. This is a catalyst of U.S. 3,168,587. The pH of the calcined catalyst was 6.3.

These catalysts were used to dehydrogenate propane or butane:

| | Run No. | | | |
|---|---|---|---|---|
| | 1 | 2 | 3 | 4 |
| | Catalyst | | | |
| | A | B | B | C |
| Paraffin used | Propane | Butane | Butane | Butane |
| Steam/hyc, mol | 3.9 | 3.8 | 3.8 | 3.5 |
| GHSV, v./v./hr.: | | | | |
| Steam | 3,000 | 1,690 | 1,690 | 1,780 |
| Paraffin | 770 | 440 | 440 | 505 |
| Air | 0 | 0 | 1 60 | 0 |
| Total | 3,770 | 2,130 | 2,190 | 2,285 |
| Temperature, ° F | 1,020 | 1,037 | 1,039 | 1,045 |
| Pressure, p.s.i.g | 250 | 75 | 75 | 75 |
| Conversion, mol percent | 15.8 | 25.9 | 11.7 | 3.9 |
| Per-pass yield, mol percent: | | | | |
| CO plus $CO_2$ | 0.2 | 7.1 | 4.5 | 0.5 |
| Lighter hyc [2] | 2.4 | 11.5 | 4.4 | 0.9 |
| Olefin [3] | 13.2 | 7.3 | 2.8 | 4 2.5 |

[1] This is equivalent to 2.7 mol percent oxygen, based on the butane.
[2] $C_1$–$C_2$ in Run 1; $C_1$–$C_3$ in Runs 2–4.
[3] Propylene in Run 1; butenes in Runs 2–4.
[4] Including 0.2 mol percent butadiene.

These data show that good olefin yields are obtained with catalysts of the invention (catalysts A and B) in the absence of oxygen (runs 1 and 2), that addition of oxygen to a catalyst of the invention (catalyst B) results in a marked decrease in olefin yield, and that a catalyst of U.S. 3,168,587 (catalyst C) is relatively inactive under the conditions of our invention—i.e., with steam and without oxygen.

EXAMPLE VII

A zinc aluminate spinel prepared in the manner described in Example II was impregnated with an aqueous solution of platinum tetrammine dihydroxide to give 0.5 weight percent platinum, the resulting composite being dried under a heat lamp until free flowing after which it was impregnated with an aqueous solution of lithium nitrate to give 0.5 weight percent lithium. The resulting composite was dried under a heat lamp until free flowing after which it was placed in the reactor, heated to reaction temperature in air and calcined in air at that temperature for about 2 hours, reduced in hydrogen, tested in butane dehydrogenation. It should be pointed out that the hydrogen reduction step is not an essential step. The catalyst was regenerated four times. Regeneration was effected by stopping hydrocarbon and steam flow, flushing with nitrogen, and passing a nitrogen-air mixture containing about 10 volume percent oxygen over the catalyst at 900° F. and a space velocity of about 3000 volumes per volume of catalyst per hour for a period of 30 to 60 minutes. Oxygen content of the regeneration gas and reactor temperature are controlled such that the catalyst temperature does not exceed about 1050° F. The data obtained in the runs are presented below:

| | 1 | 2 | 3 | 4 | 5 | 6 | 7 | 8 | 9 |
|---|---|---|---|---|---|---|---|---|---|
| Temp., ° F | 1,044 | 1,050 | 1,044 | 1,047 | 1,048 | 1,048 | 1,047 | 1,048 | 1,046 |
| Pressure, p.s.i.g | 80 | 80 | 80 | 80 | 85 | 80 | 80 | 80 | 80 |
| Steam/n-$C_4$ mol ratio | 4.7 | 4.1 | 4.2 | 4.2 | 4.2 | 4.2 | 4.2 | 4.2 | 4.2 |
| GHSV (total), v./v./hr. (14.7 p.s.i.a., 32° F.) | 6,820 | 6,870 | 6,850 | 6,880 | 6,820 | 6,880 | 6,880 | 6,860 | 6,890 |
| Total time on stream, hours | 2.0 | 28.5 | 29.5 | 51.0 | 53.0 | 79.0 | 80.0 | 84.5 | 85.5 |
| Regenerated catalyst, hours | | 28.5 | | 51.0 | | 79.0 | | 85.0 | |
| Conversion, percent | 36.6 | 29.0 | 36.1 | 29.6 | 35.6 | 29.8 | 33.9 | 28.9 | 35.6 |
| Selectivity, mol percent: | | | | | | | | | |
| Cracking | 8.4 | 5.9 | 8.0 | 6.0 | 6.7 | 5.7 | 7.0 | 6.2 | 7.6 |
| Water gas | 7.4 | 6.9 | 7.1 | 6.6 | 6.6 | 6.3 | 6.7 | 6.6 | 6.6 |
| Butene plus butadiene | 84.2 | 87.2 | 84.9 | 87.4 | 86.7 | 88.0 | 86.3 | 87.2 | 85.8 |

The above data indicate that the catalyst of the invention, prepared using platinum metal compounds free of nonvolatile acid radicals, can be used for 25 to 30 hours between regenerations, with only a small decrease in n-butane conversion. In similar runs with a catalyst prepared with platinum compounds containing a nonvolatile acid radical but otherwise prepared in the same manner, n-butane conversion decreased to less than 20% in runs of the same length.

EXAMPLE VIII

A catalyst prepared in accordance with Example II (zinc aluminate containing 0.5 wt. percent Pt and 2.0 wt. percent $K_2CO_3$) was used in the dehydrocyclization of n-hexane at a temperature of 1010° F., a pressure of 70 p.s.i.g., a gas hourly space velocity (total at normal temperature and pressure) of 4040 and a steam to hexane mole ratio of 12.9 to 1. The conversion of n-hexane per pass was 24.6%. Data obtained are presented in the table below.

Distribution of products (wt. percent):
  Lighter than $C_6$ ———————————— 11.7
  $C_6$ olefins ———————————————— 31.0
  Naphthenes ———————————————— a 14.7
  Benzene ———————————————————— a 30.5
  $Co_2$+$H_2$ ———————————————————— 12.2

Naphthenes+benzene components of product (wt. percent):

| | |
|---|---|
| Methylcyclopentane | 3.6 |
| Methylcyclopentene | 8.1 |
| Methylcyclopentadiene | 17.5 |
| Cyclopentane | 2.6 |
| $C_8$ | 0.8 |
| Benzene | 67.4 | a 45.2% product.

The presence of 14.7 wt. percent of naphthenes in the product is unexpected. In known processes the conversion of n-hexane is substantially completely to benzene.

By suitable hydrogenation and isomerization steps known in the art, all of the cyclic components of the product may be converted to cyclohexane for a yield of approximately 53 wt. percent of the n-hexane feed.

Certain modifications of the invention will become apparent to those skilled in the art and the illustrative details disclosed are not to be construed as imposing unnecessary limitations on the invention.

We claim:

1. A process for dehydrocyclicizing n-hexane to cyclic products, said products consisting of naphthenes, benzene, and mixtures thereof, which comprises contacting said n-hexane in admixture with steam in a mole ratio of steam to n-hexane in the range of 0.5:1 to 30:1 and in the absence of free $O_2$ under dehydrocyclicizing conditions with a catalyst composite including components
   (a) a support of the group alumina, HF-treated alumina, silica, magnesia, zirconia, alumino-silicates, Group II aluminate spinels, and mixtures thereof,
   (b) a metal obtained from the decomposition by calcination on said support of a metal compound of said metal, said metal selected from the group nickel, platinum, palladium, ruthenium, iridium, rhodium, osmium, and mixtures thereof, in an amount from about 0.05 to about 5.0 weight percent of said support, and
   (c) at least one compound of a metal of Group I$a$ or Group II$a$ in an amount in the range of about 0.1 to about 10 weight percent of said composite sufficient to at least neutralize the acid sites of the supported catalyst and impart to said composite a pH of at least 8.

2. The process of claim 1 wherein said component (a) is zinc aluminate support, said support comprising substantially spinel and at least 5 mole percent zinc oxide, said component (b) is platinum, said mole ratio of steam to n-hexane is in the range of 1:1 to 15:1, and operating conditions include a pressure in the range of 15 to 500 p.s.i.g., a temperature in the range of 850 to 1050° F., and a liquid hourly space velocity of n-hexane in the range of 1 to 10 volumes per volume of catalyst.

References Cited
UNITED STATES PATENTS

| | | | |
|---|---|---|---|
| 2,987,560 | 2/1961 | Holmes et al. | 260—673.5 |
| 3,126,426 | 3/1964 | Turnquest et al. | 260—683.3 |
| 3,151,180 | 9/1964 | Myers | 260—683.3 |
| 3,168,587 | 2/1965 | Michaels, et al. | 260—683.3 |
| 3,293,319 | 12/1966 | Haensel et al. | 260—683.3 |
| 3,315,008 | 4/1967 | Abell et al. | 260—683.3 |
| 3,360,586 | 12/1967 | Bloch et al. | 260—683.3 |
| 3,373,219 | 3/1968 | Kroenig et al. | 260—681.5 |
| 3,363,023 | 1/1968 | Mooi et al. | 260—683.3 |

DELBERT E. GANTZ, Primary Examiner

G. E. SCHMITKONS, Assistant Examiner

U.S. Cl. X.R.

260—683